(12) United States Patent
Kiforiuk et al.

(10) Patent No.: US 9,033,097 B2
(45) Date of Patent: May 19, 2015

(54) ELECTROMECHANICAL MOTOR VEHICLE STEERING SYSTEM

(75) Inventors: Alexander Kiforiuk, Ebersbach An der Fils (DE); Dennis Kontner, Göppingen (DE); Gergely Laszlo, Esslingen-Berkheim (DE)

(73) Assignee: ThyssenKrupp Presta AG, Eschen (LI)

( * ) Notice: Subject to any disclaimer, the term of this patent is extended or adjusted under 35 U.S.C. 154(b) by 0 days.

(21) Appl. No.: 14/346,185

(22) PCT Filed: Sep. 11, 2012

(86) PCT No.: PCT/EP2012/003809
§ 371 (c)(1),
(2), (4) Date: Mar. 20, 2014

(87) PCT Pub. No.: WO2013/056770
PCT Pub. Date: Apr. 25, 2013

(65) Prior Publication Data
US 2014/0224567 A1 Aug. 14, 2014

(30) Foreign Application Priority Data
Oct. 18, 2011 (DE) .......................... 10 2011 116 058

(51) Int. Cl.
*B62D 5/04* (2006.01)
*F16C 27/06* (2006.01)
*F16H 25/24* (2006.01)

(52) U.S. Cl.
CPC ............ *B62D 5/0403* (2013.01); *B62D 5/0448* (2013.01); *F16C 2326/24* (2013.01); *F16C 27/066* (2013.01); *F16H 2025/2445* (2013.01)

(58) Field of Classification Search
CPC ...... B62D 5/0403; B62D 5/0448; F16C 25/08
See application file for complete search history.

(56) References Cited

U.S. PATENT DOCUMENTS

| 6,499,369 B1 | 12/2002 | Piotrowski et al. |
| 2007/0193819 A1* | 8/2007 | Iwasa et al. .................... 180/444 |
| 2012/0024618 A1* | 2/2012 | Houdayer et al. ............ 180/447 |

FOREIGN PATENT DOCUMENTS

| DE | 1947337 U | 10/1966 |
| DE | 10202483 A1 | 8/2003 |

(Continued)

OTHER PUBLICATIONS

International Search Report and Written Opinion issued in PCT/EP2012/003809, mailing date Jan. 15, 2013, with English translation of the International Search Report.

(Continued)

*Primary Examiner* — Kevin Hurley
(74) *Attorney, Agent, or Firm* — Panitch Schwarze Belisario & Nadel LLP

(57) ABSTRACT

The invention relates to a servo-assisted steering system, in particular for a motor vehicle, having a servo motor which drives an axially displaceable component via a nut (1) which is mounted in a frame (9, 10) in a rotatable manner in a bearing (4), wherein the nut (1) engages with a threaded spindle (2) formed on the component and is supported via the bearing (4) elastically with respect to the frame (9, 10) in the axial direction by means of spring elements (18, 20) and is supported on the frame (9, 10) in the radial direction along a narrow encircling contact surface (8, 30), wherein the spring elements (18, 20) are corrugated springs.

7 Claims, 2 Drawing Sheets

(56) References Cited

FOREIGN PATENT DOCUMENTS

Figure 1:
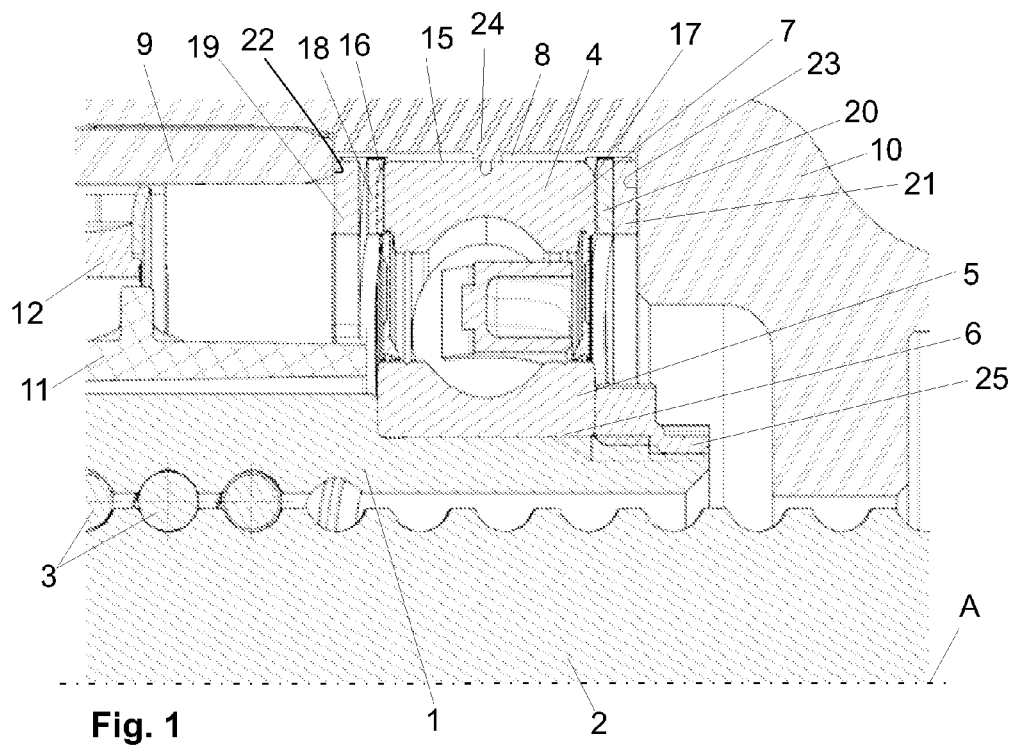

| | | |
|---|---|---|
| DE | 10310492 A1 | 9/2004 |
| DE | 102004034701 A1 | 2/2006 |
| DE | 102010002958 A1 | 9/2011 |
| EP | 1571067 A1 | 9/2005 |
| EP | 1920993 A2 | 5/2008 |
| EP | 2049383 B1 | 12/2009 |

OTHER PUBLICATIONS

International Preliminary Report on Patentability issued in PCT/EP2012/003809, date of issuance Apr. 22, 2014.

* cited by examiner

ELECTROMECHANICAL MOTOR VEHICLE STEERING SYSTEM

CROSS-REFERENCE TO RELATED APPLICATIONS

This Application is a National Stage of PCT International Application No. National Stage of PCT/EP2012/003809, filed on Sep. 11, 2012, and claims priority of German Patent Application No. 102011116058.6, filed on Oct. 18, 2011. The disclosures of the aforementioned applications are incorporated herein in their entirety by reference.

The present invention relates to a servo-assisted steering system, in particular for a motor vehicle, having a servomotor which drives an axially displaceable component via a nut which is mounted in a frame in a rotatable but axially non-displaceable manner in a bearing, according to the preamble of claim 1. In steering systems with an electromechanical servo drive operating by means of a ball screw, the ball nut is either rigidly mounted in the housing or through the use of spring elements and a specially designed housing or bearing a certain longitudinal and tilting motion is enabled. A spherical bearing, in which both the bearing ring and the frame have a spherical surface is also known. With this solution the midpoint of the spherical surface is designed to be in the centre plane of the bearing. Similar functions can be performed by spherical roller bearings and radial roller bearings, which allow an angular error of the shaft. The aim of these bearings is tolerance compensation, thereby avoiding tension in the ball screw. The dynamic and static loading of the components is also reduced. The result is improved acoustic characteristics and a reduction in the mechanical play resulting from the thermal expansion of the components.

With the described bearing between the spherical surfaces, as with the use of spherical roller bearings and radial roller bearings, a problem arises because these bearings are designed more for radial forces, whereas the loads exerted in an electrically powered steering gear on the ball nut are primarily directed axially to the steering rack or threaded spindle.

DE 10310492 A 1 describes a servo-assisted steering system, in particular for a motor vehicle, having a servo motor in the form of an electromotor, which drives an axially displaceable component in the form of push rod via a nut mounted so that it can rotate but cannot displace axially in a steering housing in the form of a frame. The servomotor, the push rod and the nut are mounted using an eccentric bearing ring so that the centre distance between the motor shaft[1] of the servo motor and the push rod can vary, allowing simple and fast assembly of the servo-assisted steering system.

[1] German reads "Motorweile" but "Motorwelle" must be meant and so has been translated thus—Translator From DE 10202483 A1 an electrical steering mechanism is known having a rack that is connected to a steering column, a motor to support a steering force with a rotor arranged coaxially on the rack, a spindle drive, on which balls are inserted between a nut wedged tight with the rotor and a screw formed on the rack, and having a housing, with a generally approximately cylindrical design. The nut of the ball screw mechanism is mounted so that it is rotatable in a bearing inside the nut housing part.

DE 1947337 U describes an elastic rolling bearing, having an axial movement and axial springing with restoring force. A rolling bearing with a bearing outer ring and a bearing inner ring, wherein the bearing outer ring and/or the bearing inner ring are in each case arranged between at least one damping element, is known from DE 10 2004 034 701 A1.

EP 1571067 A1 discloses the elastic mounting of a worm shaft which coaxially encompasses the motor shaft of a servo motor.

The generic EP 2049383 B1 illustrates a solution for allowing or improving the pivoting of the radial bearing. It is provided for the external circumference of the outer ring to have a convex curvature or for the nut, upon which the inner ring sits, to have a convex curvature. As a result of the convex curvature of the external circumference of the outer ring or nut, release of the radial bearing and the ability to pivot of the nut and the axially displaceable component shall be achieved. On each end face of the radial bearing a steel ring with a vulcanised element having elastomeric properties is provided, which under fluctuating loads shall allow an axial and radial damping and the performance and damping of a pivoting movement of the axially displaceable component. In the presence of bending moment stressing of the axially displaceable component strain on the system shall be avoided. Manufacture of the components used and their assembly is complex.

The problem for the invention, therefore, is to provide a servo-assisted steering system with a tiltable ball nut mounting, which can be built using simpler components and is easy to assemble.

This problem is solved by a servo-assisted steering system with the features of claim 1.

Because with the servo-assisted steering system having a servomotor, which drives an axially displaceable component via a nut which is mounted in a frame in a rotatable manner in a bearing, wherein the nut engages with a threaded spindle formed on the component and is supported via the bearing elastically with respect to the frame in the axial direction by means of spring elements and is supported on the frame in the radial direction along a narrow encircling contact surface, the spring elements are in the form of corrugated springs, axial springing of the bearing and thus also the nut is possible with very simple and cheap components that have been tried and tested in practice.

If between the spring elements and the frame thrust washers are inserted, the frame, which normally comprises the steering housing or parts of this, can be made from a light metal alloy. The thrust washers prevent the corrugated springs working into the light alloy when in operation. Direct support for the bearing outer ring with respect to the frame results if the corrugated springs are arranged either side of the bearing respectively between the outer ring of the bearing and collar of the frame. The frame can comprise a housing and a housing cover, wherein one of the collars is formed on the housing cover and wherein the other collar is formed on the housing or on a sleeve that can be inserted in the housing. The embodiment with the separate sleeve that can be inserted in the housing is easier to assemble. Here, apart from the collar, the sleeve can have a bearing seat, which holds the outer bearing ring of the bearing against its outer circumferential surface. In this way the bearing can be preassembled with the axial support in the sleeve. Preferably the nut is also already assembled in the bearing, so that the complete unit can be assembled by use of the tube. The bearing seat for the nut bearing, together with the bearing outer ring, can form a bearing surface, which in the axial direction of the arrangement is narrower than the bearing outer ring itself. This bearing surface can for example take the form of an encircling web or an encircling rib, which in the idle position of the arrangement rests approximately centrally on the bearing outer ring. Such an embodiment allows a restricted amount of tilting movement of the bearing, which will also be made possible by axial springing with corrugated springs. The contact surface between the bearing outer ring and the bearing seat can also be designed to be almost linear, if the bearing surface is designed as a section of a convex surface of the bearing seat pointing inwards to the bearing, wherein as above the bearing surface shall encircle and in the axial direction of the arrangement rest approximately centrally on the outer surface of the bearing outer ring.

Figure 2:
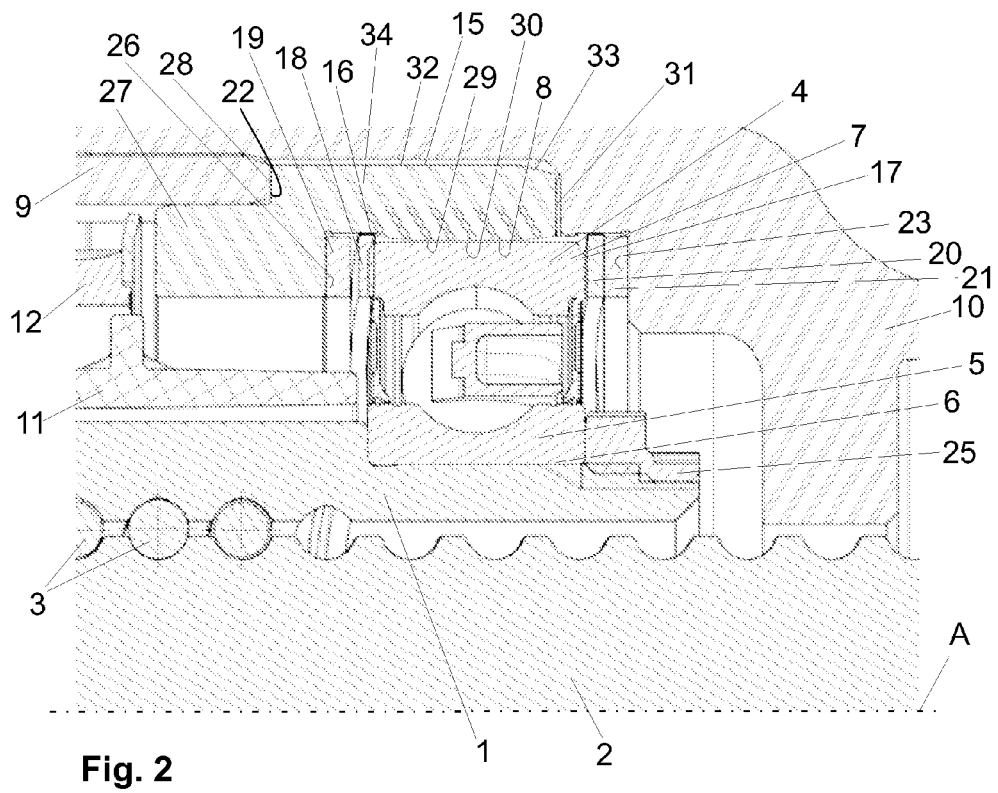
Figure 3:
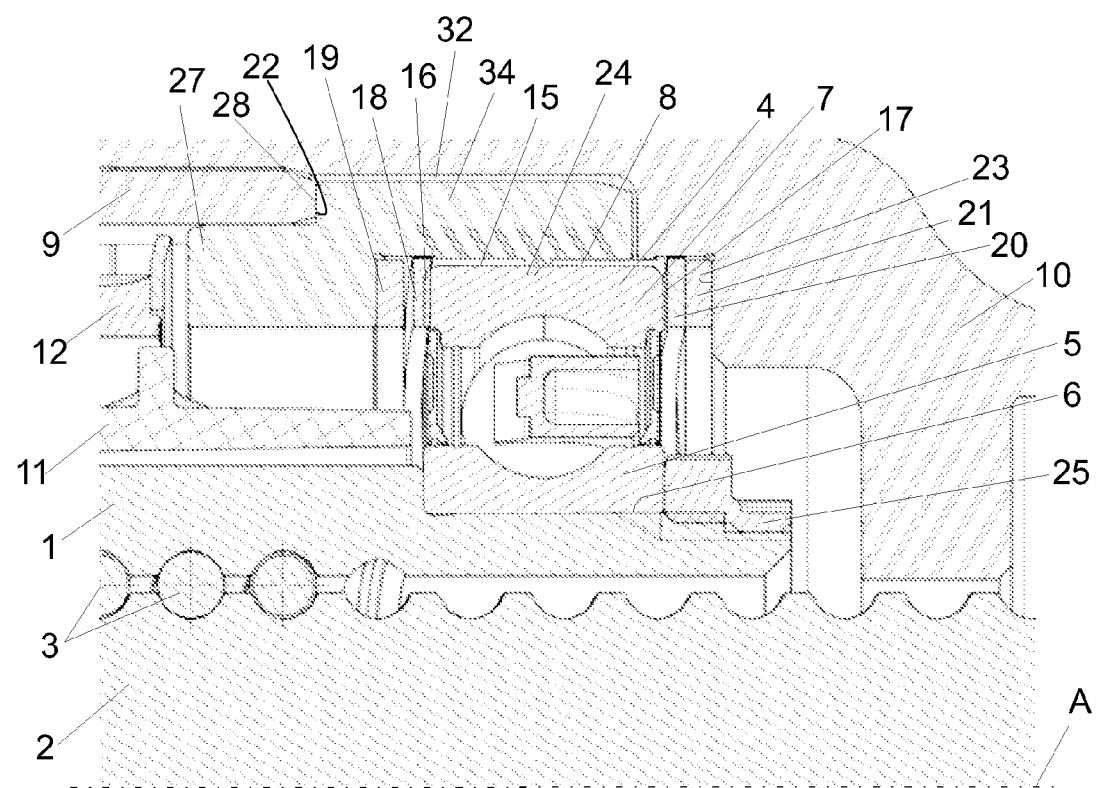

In the following embodiments of the invention are described with the use of the drawing. This shows as follows:

FIG. 1: the mounting of a ball nut in a steering housing with axial support against the housing and against the housing cover;

FIG. 2: the axial supporting of the bearing in an inserted sleeve with convex design of the outer bearing seat; and FIG. 3: an arrangement according to FIG. 2 with an encircling rib for radial support of the bearing outer ring.

FIG. 1 shows a section of an electrically powered servo-assisted steering system for a motor vehicle in longitudinal section. The section shows the top half of a longitudinal section along the symmetrical axis A in an area in which a ball nut 1 engages with a threaded spindle 2. Between the ball nut 1 and the threaded spindle 2 balls 3 of a recirculating ball arrangement are arranged in a known manner. The ball nut 1 is mounted in a bearing 4 in a rotatable manner. The bearing 4 has an inner ring 5, secured tightly to a bearing seat 6 of the ball nut 1. The bearing 4 also has an outer ring 7, arranged in a bearing seat 8 of a frame. In this embodiment the frame comprises a steering housing 9 with an approximately tubular form in this area, which is sealed by a housing cover 10. The housing cover 10 encompasses the steering housing 9 on its outside and is secured by securing means that are not shown to the steering housing 9.

The ball nut 1 also supports an intermediate sleeve 11, upon which a pulley 12 of a toothed belt drive is secured so that it cannot rotate. In connection with the present invention the locating of the bearing outer ring 7 in the bearing seat 8 and in particular the supporting in the axial direction of the longitudinal axis A are significant. This will be explained in more detail in the following.

The bearing outer ring 7, as is normally the case with rolling bearings, has an outer circumferential surface 15, with a first end face 16 and a second end face 17. A corrugated spring 18 rests against the first end face 16, supported by a thrust washer 19. Accordingly, the second end face 17 rests against a corrugated spring 20, which in turn is supported in the axial direction of the longitudinal axis A by a thrust washer 21. The corrugated springs 18 and 20 are ring-shaped springs, with an approximately uniform radius, which preferably corresponds to the radius of the bearing outer ring 7. The corrugated springs 18 and 20 are not flat, but when viewed from the side exhibit a corrugated design as shown in FIG. 1. This corrugated design allows the corrugated springs 18 and 20 to compress in the axial direction between the bearing outer ring 7 and the thrust washers 19 or 21. In so doing elastic deformation takes place, which is reversible and, in the idle position, positions the bearing outer ring 7, as shown in FIG. 1, centrally between the thrust washers 19 and 21. The corrugated springs 18 and 20 are thus simple, tried and tested components, which are not destroyed even under high loading in the axial direction. The thrust washers 19 and 21 are steel rings, preferably hardened. These steel rings are suitable for absorbing the slight movement of the corrugated springs 18 and 20 during operation, without the corrugated springs, which are similarly made from hard metal, working into the thrust washers 19 and 21. The thrust washers 19 and 21 can therefore be particularly advantageously used if the frame (here the steering housing 9 and the housing cover 10) is made from a light metal alloy or a similar, relatively soft material.

The design shown provides that the thrust washer 19 rests directly on an end face 22 of the steering housing 9. The second thrust washer 21 accordingly rests on a collar 23 of the housing cover 10, which in the fitted state faces the end face 22 at a distance. In the radial direction the bearing outer ring 7 is supported with its outer circumferential surface 15 by a web 24, with an encircling form in the bearing seat 8. Together with the bearing outer ring 7 the web 24 forms a narrow, circular, circumferential bearing surface, allowing tilting of the bearing outer ring 7 in relation to the bearing seat 8 to a minor extent.

Finally, the bearing inner ring 5 is secured in its bearing seat 6 by a threaded nut 25, which is screwed onto a corresponding thread of the nut 1.

For assembly the unit is first assembled, secured against rotation by nut 1. This unit comprises the sleeve 11 and pulley 12 as well as the bearing 4. This unit is then introduced together with the corrugated spring 18 and the thrust washer 19 into steering housing 9, until the thrust washer 19 rests against the end face 22 of the steering housing 9. The threaded spindle 2 can be threaded into the nut 1 before or after this assembly process. Then the corrugated spring 20 and the thrust washer 21 are placed on the bearing outer ring 7 and the housing cover 10 is positioned and secured in a flange area (not shown) to the housing 9.

In operation an electric servomotor can now via a belt drive start rotation of the pulley 12 and thus the nut 1, as a result of which via the balls 3 the threaded spindle 2 is displaced in an axial movement, which ultimately brings about the steering movement of the motor vehicle. The ball nut 1 can move in the bearing seat 8 in the manner described in the axial direction against the restoring force of the corrugated springs 18 and 20. The narrow bearing surface in the area of the web 24 also allows a slight tilting movement. In this way dynamic loadings can be absorbed which without this special mounting would lead to excessive loads on the nut 1 and the threaded spindle 2 in the area of the balls 3.

Another embodiment of the invention is shown in FIG. 2. Identical or identically operating components are given the same references. In the embodiment of FIG. 2, bearing 4 is designed to be smaller. Its outer bearing ring 7 is supported as in FIG. 1 in the axial direction to the right via the corrugated spring 20 and the thrust washer 21 against the collar 23 of the housing cover 10. In the opposing axial direction the bearing outer ring 7 is supported with its end face 16 via the corrugated spring 18 and the thrust washer 19 against a collar 26, formed in a sleeve 27. The sleeve 27 is an essentially tubular component, divided up into several sections which will be described in the following.

The sleeve 27 has an internal diameter, which is large enough to allow the ball nut, the intermediate sleeve 11 and the threaded nut 25 to be passed through the sleeve 27. A first section, which is shown in FIG. 2 on the left, has an external diameter, which corresponds to the internal diameter of the steering housing 9. The sleeve 27 can be introduced with this section into the steering housing 9. Then on this section the external diameter of the sleeve 27 broadens into a collar 28, so that the collar 28 can rest against the end face 22 of the steering housing 9. The external diameter of the sleeve 27 expanded in a further section corresponds approximately to the external diameter of the steering housing 9 and the internal diameter of the cover 10 in this area, wherein between the sleeve 27 and the housing cover 10 a gap is provided.

At the collar 26 in FIG. 2, against which the thrust washer 19 rests, the internal diameter of the sleeve 27 increases from a value corresponding to the internal diameter of the thrust washer 19, to an internal diameter, which is greater than that of the thrust washer 19 and also greater than that of the corrugated spring 18. The corrugated spring 18 and the thrust washer 19 can thus be introduced into the sleeve 27 until they come against the collar. The external diameter of the sleeve 27 remains unchanged in this area. At a position which in the axial direction of the symmetrical axis A approximately coincides with the position of the left end face 16 of the bearing outer ring 7, an inwardly convex area 29 of the sleeve 27 is attached. The area 29 has a convex or spherical design such that in a continuous convex curvature the radius starting from the larger radius in the area of the corrugated spring 18 continuously decreases until a minimum radius 30 is reached, and then increases again to approximately the value of the larger internal diameter in the area of the corrugated spring 18. This convex area 29 ends where the sleeve 27 also ends. At that point an end face 31 is formed, which is flat and directed fully vertically to the axis A. The outside of the sleeve 27 has a perfectly circular cylindrical section 34, which with a constant diameter runs at a slight distance 32 from the housing cover 10 and narrows with an assembly chamfer 33 to the end face 31.

The internal diameter of the sleeve 27 in the area of the smallest radius 30 of the convex area 29 corresponds to the external diameter of the bearing outer ring 7. Since the bearing outer ring 7 on its outside geometrically corresponds to a circular cylinder with constant diameter, the bearing surface of the bearing outer ring 7 at the convex area 29 in the position shown is almost linear. Under load the bearing outer ring 7 and with it the bearing 4 and the entire arrangement of ball nut 1, balls 3 and threaded spindle 2 can move against the restoring force of the corrugated springs 18 and 20 in the direction of axis A. Because of the linear contact with the convex area 29, however, the bearing outer ring 7 can be tilted to a minor extent. This then ensures that at their load peaks dynamic loads on the nut 1 can be neutralised by a certain manoeuvrability of the bearing 4.

The embodiment of FIG. 2 has the advantage over the embodiment of FIG. 1, that the bearing 4 can be dimensioned smaller and that above all through the sleeve 27 the entire unit can be further pre-assembled. In particular the sleeve 27, prior to introduction into the steering housing 9, can already accommodate the corrugated spring 18 and the thrust washer 19 as well as the bearing 4 with the nut 1 assembled in it and possibly the already attached threaded spindle 2. Inserting the sleeve 27 in the bearing 9 is simpler than the assembly of the embodiment according to FIG. 1. The assembly advantage in many cases outweighs the increased cost of the sleeve 27. Alternatively it is also conceivable and possible for the sleeve 27 with the section 34 to be pressed into the housing cover, with the distance 32 accordingly not being present, or to be designed with the corresponding press-fit. In this way, in this alternative embodiment the package comprising bearing 4 and the corrugated springs 18, 20 as well as the thrust washers 19 can be installed as a pre-assembled unit with the other parts of the motor vehicle servo-assisted steering system. A simplified embodiment provides that the sleeve 27 is made from a hard or hardened steel alloy. With this embodiment, which is not shown, the thrust washer 19 can be dispensed with, so that the corrugated spring 18 can be supported directly against the collar 26 of the sleeve 27. With a suitable choice of material there is no danger of the corrugated spring 18 working into the material of the sleeve 27 over time. As described above, the steering housing 9 and the housing cover 10 can be made from a light metal alloy or a suitable plastic.

FIG. 3 shows a third embodiment of the present invention, in which in contrast to FIG. 1 a sleeve 27 is provided for assembly of the bearing 4 in the steering housing 9. In this respect this embodiment corresponds to the embodiment shown in FIG. 2. In contrast to FIG. 2 the sleeve 27 in the area of the bearing seat 8 of the bearing 4 has an encircling web 24 pointing inwards. In this respect the embodiment according to FIG. 3 in the area of the bearing seat 8 corresponds to the embodiment described for FIG. 1. The assembly advantages as a result of the sleeve 27 are also provided by the embodiment from FIG. 3. The bearing seat 8 with the encircling web 24 is easier to manufacture, however, than the convex area show in FIG. 2 in the area of the bearing seat. The web 24 is dimensioned to be sufficiently narrow to allow a slight tilting of the bearing 4 here, if an external dynamic load requires this.

Purely for the avoidance of doubt, it is mentioned that the rotating components, and the sleeve, and the internal areas of the steering housing 9 and of the housing cover 10, as well as the sleeve 27, are designed to be essentially rotationally symmetrical to the longitudinal axis A. The sleeve 27 can in particular be made as a rotating part.

In all embodiments it is conceivable and also possible to provide the surfaces in frictional contact with friction-reducing surfaces.

KEY

1. Ball nut
2. Threaded spindle
3. Ball
4. Bearing
5. Inner ring
6. Bearing seat
7. Outer ring
8. Bearing seat
9. Steering housing
10. Housing cover
11. Intermediate sleeve
12. Pulley
15. Circumferential surface
16. End face
17. End face
18. Corrugated spring
19. Thrust washer
20. Corrugated spring
21. Thrust washer
22. End face
23. Collar
24. Web
25. Threaded nut
26. Collar
27. Sleeve
28. Collar
29. Convex area
30. Radius
31. End face
32. Gap
33. Assembly chamfer
34. Section

What is claimed is:

1. A servo-assisted steering system, including:
a servo motor;
an axially displaceable component configured to be driven by the servo motor via a nut mounted in a frame in a rotatable manner in a bearing, wherein the nut engages with a threaded spindle formed on the component and is supported via the bearing elastically with respect to the frame in the axial direction of the axially displaceable component by means of spring elements and is supported on the frame in the radial direction of the axially displaceable component along a narrow encircling contact surface, wherein the spring elements are corrugated springs; and thrust washers inserted between the spring elements and the frame.

2. The servo-assisted steering system according to claim 1, wherein the corrugated springs are, respectively, positioned between an outer ring of the bearing and a collar of the frame.

3. The servo-assisted steering system according to claim 2, wherein the frame comprises a housing and a housing cover, wherein one of the collars is formed on the housing cover, and wherein the other collar is formed on the housing or on a sleeve that can be inserted in the housing.

4. The servo-assisted steering system according to claim 3, wherein the sleeve further includes a bearing seat configured to hold the outer ring of the bearing against an outer circumferential surface.

5. The servo-assisted steering system according to claim 4, wherein the bearing seat, along with the outer ring of the bearing, forms a bearing surface, which in the axial direction of the axially displaceable component is narrower than the outer ring of the bearing.

6. The servo-assisted steering system according to claim 5, wherein the bearing surface is designed as a circumferential rib.

7. The servo-assisted steering system according to claim 5, wherein the bearing surface is designed as a linear section of a convex surface of the bearing seat pointing inwards to the bearing.

* * * * *